Figure 1:
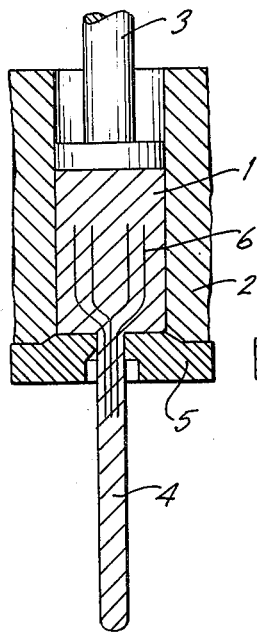

June 5, 1962 W. ROSENKRANZ 3,037,623
METHOD OF FORMING TUBULAR BODIES
Filed July 13, 1959

INVENTOR.
Wilhelm Rosenkranz
BY Michael S. Striker
Attorney

United States Patent Office 3,037,623
Patented June 5, 1962

3,037,623
METHOD OF FORMING TUBULAR BODIES
Wilhelm Rosenkranz, Eichholz, Meinerzhagen, Germany, assignor to Otto Fuchs K.G., Meinerzhagen, Westphalia, Germany
Filed July 13, 1959, Ser. No. 826,814
Claims priority, application Germany July 15, 1958
4 Claims. (Cl. 207—10)

The presention relates to a method of manufacturing tubular bodies, and more particularly the present invention relates to a multi-step extrusion method for manufacturing tubular bodies having a closed end wall.

Tubular bodies having a closed end wall, such as containers, open at one end, can be produced by impact extrusion, i.e. by placing a body of extrudable material into a mold and pressing downwardly onto said body of material with a ram having a diameter smaller than the diameter of the mold and of the body of extrudable material, so that flow of material will take place in countercurrent direction to the movement of the ram and between the same and the inner wall of the mold. However, it has been found that by producing in the above described manner tubular bodies having a closed end, the mechanical properties of the thus formed open container will not be as desired, particularly in the area of the bottom of the container and of the tubular container wall portion adjacent to the bottom portion of the container.

The lack of mechanical strength in these areas of the container appear to be due to a disadvantageous grain orientation or flow-line of the metal, i.e. line of flow of the crystals of the material forming these areas of the container. Optimum and most desirable grain orientation will be parallel to the respective wall portions, i.e. in the bottom of the container, grain orientation should preferably be parallel to the bottom wall of the container, and in the tubular side wall of the container, grain orientation should be parallel to such tubular side wall, whereby it is important to avoid as much as possible a grain orientation in cross-sectional direction of either the tubular side walls or the bottom or end wall of the container.

It has been attempted in various ways to favorably influence the grain orientation in extruded tubular bodies having a closed end, however, it was not possible up to now to obtain the desired results, and particularly, it was not possible to obtain favorable grain orientation in a simple and economical manner.

It is therefore an object of the present invention to provide a method for extruding tubular bodies closed at one end which will overcome the above discussed disadvantages.

It is another object of the present invention to provide a method for extruding tubular bodies closed at one end in such a manner that a desirable grain orientation will be achieved in the closed end portion of the tubular body.

It is a further object of the present invention to provide a method for extruding tubular bodies closed at one end, according to which in a simple and economical manner, a grain orientation substantially parallel to the bottom wall and to the tubular side wall adjacent the bottom wall of the extruded body, is obtained.

Other objects and advantages of the present invention will become apparent from a further reading of the description and of the appended claims.

With the above and other objects in view, the present invention includes a method of manufacturing a tubular body having a closed end wall, comprising the steps of extruding a portion of a body of extrudable material having a predetermined cross-sectional area in such a manner that the extruded portion has a smaller cross-sectional area than the predetermined cross-sectional area whereby in the remainer of the body in the region adjacent to the extruded portion the grain orientation of the material will become substantially parallel to the surface of the remainder of the body, detaching the extruded portion from the remainder of the body, and subjecting the remainder of the body to impact extrusion directed toward the adjacent region of the remainder of the body so as to impact extrude the remainder of the body into a tubular body having in the adjacent region a closed end wall with a grain orientation being substantially parallel to the walls of the container in the region of the end wall.

According to a preferred manner of carrying out the present invention, the same contemplates a method of manufacturing a tubular body having a closed end wall, comprising the steps of extruding at one end face of predetermined surface area of an initial body or billet of aluminum alloy, substantially at the center of the one end face, a rod having a cross-sectional area of about one-twentieth of the predetermined surface area and having a volume equal to about ten percent of the volume of the initial body, separating the thus extruded rod from the remainder of the body, the remainder of the body thus being formed with an end face having a surface area corresponding to the surface area of the end face of the initial body of extrudable material, extrusion of the rod causing in the vicinity of the end face of the remainder of the body a flow of material towards the center of the end face of the remainder of the body, subjecting the remainder of the body to extrusion in the direction towards the end face thereof so as to transform the remainder of the body into a substantially cylindrical body having a cross-sectional area equal to about two-thirds of the predetermined surface area and including an annular edge portion in the area of the edge of the end face, whereby the major portion of the material of the remainder of the body with the exception of the annular edge portion is subjected to a kneading deformation and grain orientation substantially parallel to the respective adjacent surface of the thus extruded remainder of the body, separating the annular edge portion and the end portion opposite the end face from the extruded remainder of the body, and subjecting the thus extruded remainder of the body after separation of the annular edge portion and of the end portion opposite the end face to impact extrusion in the direction towards but spaced from the end face thereof in such a manner as to form a hollow cylindrical body consisting essentially of a tubular side wall and an end wall terminating in the end face, whereby the grain of the aluminium alloy forming the walls will be oriented substantially parallel to the same.

Thus, according to the present invention, the desired grain orientation in the tubular body is to a large extent prearranged in the extrudable material prior to the impact extrusion of the same.

The present method can be carried out in connection with hot or cold extrudable materials, however, it has been found particularly suitable for the impact extrusion of tubular bodies closed at one end from light metals and light metal alloys.

According to the present invention, a cylindrical body of the extrudable material, such as an aluminum alloy, is first subjected to deformation by extruding a rod at one end of the cylindrical body of the extrudable material. With a relatively high degree of deformation, for instance, between 90 and 95%, a rod is thus formed of a portion of the extrudable material, until the initial volume of the cylindrical body has been reduced by a desired percentage, for instance, by 10%. The thus produced rod is then separated from the remainder of the extrudable body, and the remainder is then subjected to impact extrusion so as to form therefrom a tubular body closed at one end, whereby the closed end of the tubular body will be formed of the region of the tubular body adjacent to the point of extrusion of the rod.

When it is desired to accomplish a more thorough kneading of the entire ingot or cylindrical body prior to impact extrusion of the same, the cylindrical body as a whole may be subjected to extrusion so as to reduce the cross-sectional area of the same, after the rod has been extruded and separated from the remainder of the cylindrical body and prior to impact extrusion of the same.

Furthermore, it has been found that optimum conditions with respect to grain orientation in the bottom and adjacent areas of the container produced by impact extrusion can be achieved by removing, prior to impact extrusion, a portion of the cylindrical body of extrudable material which has not been sufficiently kneaded by the preceding steps of extruding the rod and reducing the diameter of said body by extrusion of the same. This insufficiently or not at all kneaded portion comprises the region of contact between the tubular surface and the front end face of the cylindrical body (while the body which is to be subjected to impact extrusion is herein sometimes referred to as a cylindrical body, the invention is not to be considered limited to the impact extrusion of cylindrical bodies). Preferably, the insufficiently kneaded portion of the extrudable body is removed mechanically prior to subjecting the remainder of the body to impact extrusion, as will be more fully described further below.

However, a substantially similar effect as is achieved by removing the insufficiently kneaded lower rim portion of the extrudable body, can also be accomplished by employing in the extrusion of the rod a pressure tool which contacts the block in an area concentric with the extrusion opening under an obtuse rather than a right angle, i.e. a tool, the pressure face of which extends under an obtuse angle to the direction of pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1–6 are elevational, cross-sectional, schematic illustrations of the process of the present invention and of the apparatus for carrying out the same.

Referring now to the drawing, and particularly to FIG. 1, wherein the extrusion of a rod from a cylindrical body of extrudable material is shown, it will be seen that a body of extrudable material 1 is extruded by being subjected in a recipient 2 to pressure exerted by a ram 3, so that a rod 4 is extruded through die 5. Lines 6 illustrate the direction of grain orientation, and it can be seen that extrusion of the rod causes a change in the direction of the grain orientation converging towards the extrusion opening of die 5.

Figure 2:
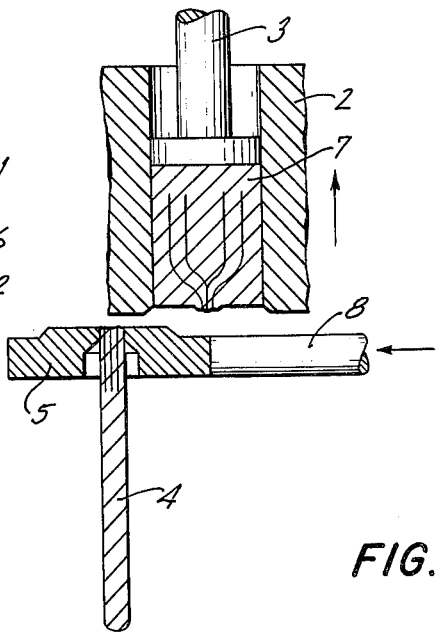

FIG. 2 schematically illustrates the separation of rod 4 from the remainder 7 of the extrudable material by lateral movement of die support 8 and die 5 in such a manner as to cause shearing off of rod 4 from remainder 7 of the body of extrudable material.

It must be noted that, by carrying out the steps of the present invention illustrated in FIGS. 1 and 2, already a very considerable improvement in the grain orientation and in the mechanical properties of the eventually produced container or the like is achieved.

Figure 3:
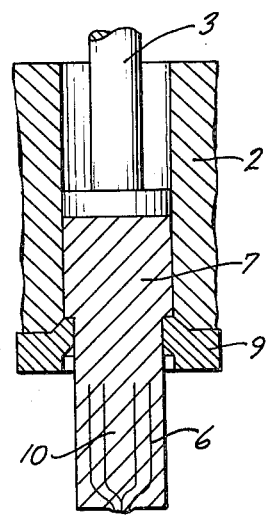

However, when it is desired to further improve the mechanical properties of the end product by obtaining a grain orientation which will be more completely parallel to the respective container walls, the remainder 7 of the extrudable body is subjected, as illustrated in FIG. 3, to extrusion through a die 9 which is of lesser diameter and cross-sectional area than the remainder 7 of the extrudable body, which, however, is of considerably larger diameter and cross-sectional area than rod 4. As illustrated in FIG. 3, this second extrusion will result in further converging of the lines of grain orientation 6 in the thus formed extruded body 10.

For instance, a cylindrical body 1 having a diameter of 440 mm. may be subjected to rod-forming extrusion and, after removal of rod 4 which has a diameter of 100 mm., the remainder 7 of the cylindrical body may be extruded so as to reduce the diameter thereof from 440 mm. to 358 mm.

Figure 4:
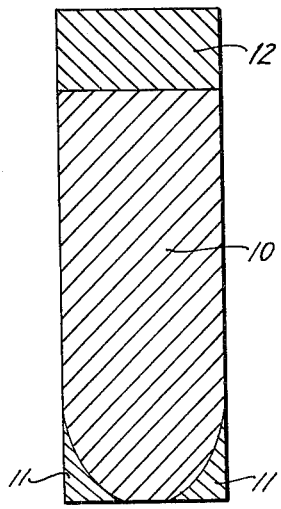

The thus obtained extruded body 10 is shown in an enlarged cross section in FIG. 4. The areas of extrudable body 10 which do not show the desired grain orientation, are illustrated by cross hatching and identified by reference numeral 11. Furthermore, cross hatched area 12 denotes the portion of body 10 which has been closest to pressure ram 3 and may contain faults such as pipings or the like.

According to a preferred manner of carrying out the present invention, the portions 11 and 12 are mechanically removed from body 10 prior to subjecting the same to impact extrusion. The degree to which the annular rim area 11 in which the cast structure of the material has not disappeared due to insufficient kneading of the same during the preceding extrusion steps, and wherein the structure of the original casting will also not disappear during subsequent impact extrusion, is to be removed, can be easily determined by anyone skilled in the art in accordance with specific prevailing conditions and the type of extrudable material.

Figure 5:
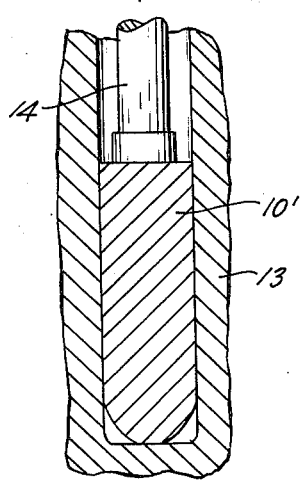
Figure 6:
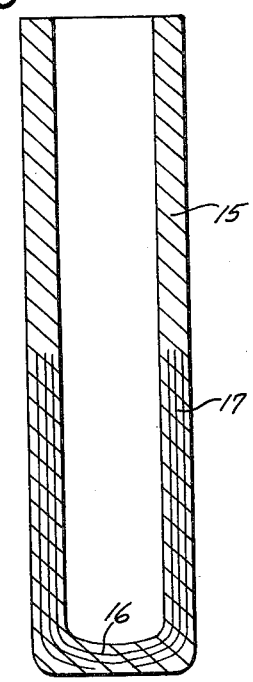

FIG. 5 illustrates impact extrusion of a body 10' of extrudable material. Body 10' is formed by mechanically removing the portions indicated by reference numerals 11 and 12 in FIG. 4. Body 10' is placed in a receiving mold 13 and subjected to impact extrusion by means of ram 14. Downward pressure exerted by ram 14 will cause upward movement of peripheral portions of body 10' and will also cause the forming of a substantially flat bottom portion. The finished tubular body is illustrated in FIG. 6, showing tubular wall 15 and integral therewith bottom wall 16. The direction of grain orientation is illustrated by line 17 and it can be seen that grain orientation is substantially parallel to the respective wall portion.

The following example is given as illustrative only, the present invention, however, not being limited to the specific details of the example.

*Example*

A cylindrical aluminum alloy casting having a length of 1 mm. and a diameter of 440 mm., consisting of an aluminum alloy containing 4.7% copper, 0.71% magnesium, 0.79% silicon, 0.85% manganese, 0.18% zinc, 0.34% iron, and the balance aluminum, is subjected to homogenizing annealing and subsequently deformed in an extrusion press at a temperature of between 440 and 460° C. and at a degree of deformation of about 95%, until a rod of 2 m. length and 100 mm. diameter has been extruded.

Thereafter, the thus extruded rod is sheared off and the extrusion die used for extruding the rod is exchanged against a die of larger diameter. The cylindrical body of aluminum alloy which thus has been reduced in volume by about 10%, and which still has a diameter of 440 mm., is now extruded to form a cylindrical block having a reduced diameter of 358 mm. The portion of the thus formed cylindrical body of reduced diameter which is closest to the pressure ram used for extruding the same, is now cut off so that a cylinder having a length of 720 mm. remains. The border area at the front end of the cylindrical body, i.e. the areas which were not sufficiently kneaded and which are indicated by reference numeral 11 in FIG. 4 of the drawing, are now removed by turning under an angle of 45° relative to the front end and the tubular side face of the cylinder. The thus prepared cylinder is then subjected to impact extrusion so as to form a hollow body closed at one end and having a wall thickness of 25 mm. Grain orientation in the closed bottom and the adjacent tubular side wall portion of the cylinder will now be substantially parallel to the closed bottom and the tubular cylinder side wall, respectively, and any remnants of the cast alloy structure will have disappeared.

It has been found, that the above described process of the present invention can also be carried out as a one-step process, in such a manner that the extrusion of the rod at the front end of the body of extrudable material takes place simultaneously or partially simultaneously with the impact extrusion of the major portion of the body of extrudable material. In order to limit the quantity of material which during such one-step process will be extruded in the form of a rod, the flow of extruded material through the rod-forming extrusion die must be slowed. This can be achieved by increasing the length of the die portion through which the rod has to flow and possibly by arranging the extrusion die channel at an angle relative to the direction of pressure. Furthermore, means for closing the die opening after a sufficient length of rod has been extruded, may also be provided so that extrusion of the rod will take place simultaneously with the initial stages of the impact extrusion of the main body of material, however, impact extrusion will be completed after completion of extrusion of the rod.

Without further analysis, the foregoing will so fully reveal the gist of the present invention that others can by applying current knowledge readily adapt it for various applications without omitting features that, from the standpoint of prior art, fairly constitute essential characeristics of the generic or specific aspects of this invention and, therefore, such adaptations should and are intended to be comprehended within the meaning and range of equivalence of the following claims.

What is claimed as new and desired to be secured by Letters Patent is:

1. Method of manufacturing a tubular body having a closed end wall from a substantially cylindrical billet, comprising the steps of placing said billet into a cylindrical extrusion chamber into which said billet fits, said extrusion chamber being open at one end and having at the other end an extrusion opening substantially smaller than the cross sectional area of said cylindrical billet; extruding in a first extrusion step through said opening of said cylindrical extrusion chamber a portion of said billet, whereby during such extrusion the grain orientation in the region of the cylindrical surface of the unextruded billet portion will become substantially parallel to said surface and in the region of the end portion of said unextruded billet portion facing said extrusion opening will become converging towards said extrusion opening; then detaching said extruded billet portion from said unextruded billet portion; and subjecting said unextruded billet portion in an extrusion chamber into which said unextruded billet portion fits and which is open at one end and closed at the other end thereof to inverse extrusion by an extrusion member having a cross sectional area being smaller than the cross sectional area of said unextruded cylindrical billet portion so as to extrude said unextruded billet portion in a direction opposite to said closed end of said extrusion chamber, thus forming an extruded tubular body having a closed end wall with a grain orientation extending in said end wall substantially perpendicular to the axis of said tubular body and continuing in the tubular wall of said tubular body substantially parallel to said axis thereof.

2. Method of manufacturing a tubular body having a closed end wall from a substantially cylindrical billet, comprising the steps of placing said billet into a cylindrical extrusion chamber into which said billet fits, said extrusion chamber being open at one end and having at the other end an extrusion opening substantially smaller than the cross sectional area of said cylindrical billet; extruding through said opening of said cylindrical extrusion chamber a portion of said billet, whereby during such extrusion the grain orientation in the region of the cylindrical surface of the unextruded billet portion will become substantially parallel to said surface and in the region of the end portion of said unextruded billet portion facing said extrusion opening will become converging towards said extrusion opening; then detaching said extruded billet portion for said unextruded billet portion; subjecting said unextruded billet portion to extrusion so as to transform said unextruded billet portion into an extruded body having a cross sectional area greater than the cross sectional area of said detached extruded billet portion and smaller than the cross sectional area of the original substantially cylindrical billet; and subjecting the thus-formed extruded body in an extrusion chamber into which the same fits and which is open at one end and closed at the other end thereof to inverse extrusion by an extrusion member having a cross sectional area being smaller than the cross sectional area of said extruded body so as to extrude said extruded body in a direction opposite to said closed end of said extrusion chamber, thus forming an extruded tubular body having a closed end wall with a grain orientation extending in said end wall substantially perpendicular to the axis of said tubular body and continuing in the tubular wall of said tubular body substantially parallel to said axis thereof.

3. Method of manufacturing a tubular body having a closed end wall from a substantially cylindrical billet, comprising the steps of placing said billet into a cylindrical extrusion chamber into which said billet fits, said extrusion chamber being open at one end and having at the other end an extrusion opening substantially smaller than the cross sectional area of said cylindrical billet; extruding through said opening of said cylindrical extrusion chamber a portion of said billet, whereby during such extrusion the grain orientation in the region of the cylindrical surface of the unextruded billet portion will become substantially parallel to said surface and in the region of the end portion of said unextruded billet portion facing said extrusion opening will become converging towards said extrusion opening; then detaching said extruded billet portion from said unextruded billet portion; subjecting said unextruded billet portion to extrusion so as to transform said unextruded billet portion into an extruded body having a cross sectional area greater than the cross sectional area of said detached extruded billet portion and smaller than the cross sectional area of the original substantially cylindrical billet and including an annular edge portion in the area of the edge of the end face from which said extruded billet portion has been detached whereby the major portion of the material of said extruded body with the exception of said annular edge portion thereof is subjected to a kneading deformation and grain orientation substantially parallel to the respective adjacent surface of the thus extruded body; separating said annular edge portion from said extruded body; and subjecting the thus-formed body after separation of said annular edge portion in an extrusion chamber into which the same fits and which is open at one end and closed at the other end thereof to inverse extrusion by an extrusion member having a cross sectional area being smaller than the cross sectional area of said extruded body so as to extrude said extruded body in a direction opposite to said closed end of said extrusion chamber, thus forming an extruded tubular body having a closed end wall with a grain orientation extending in said end wall substantially perpendicular to the axis of said tubular body and continuing in the tubular wall of said tubular body substantially parallel to said axis thereof.

4. Method of manufacturing a tubular body having a closed end wall from a substantially cylindrical billet, comprising the steps of placing said billet into a cylindrical extrusion chamber into which said billet fits, said extrusion chamber being open at one end and having at the other end an extrusion opening substantially smaller than the cross sectional area of said cylindrical billet; extruding in a first extruding step through said opening of said cylindrical extrusion chamber a portion of said cylindrical billet, said extruded portion of said cylindrical billet having a volume equal to between 5 and 10% of the volume of said cylindrical billet and having a cross sectional area equal to between $\frac{1}{10}$ and $\frac{1}{50}$ of the cross sectional area of said cylindrical billet, whereby during such extrusion the grain orientation in the region of the cylindrical surface of the unextruded billet portion will become substantially parallel to said surface and in the region of the end portion of said unextruded billet portion facing said extrusion opening will become converging towards said extrusion opening; then detaching said extruded billet portion from said unextruded billet portion; and subjecting said unextruded billet portion in an extrusion chamber into which said unextruded billet portion fits and which is open at one end and closed at the other end thereof to inverse extrusion by an extrusion member having a cross sectional area being smaller than the cross sectional area of said unextruded cylindrical billet portion so as to extrude said unextruded billet portion in a direction opposite to said closed end of said extrusion chamber, thus forming an extruded tubular body having a closed end wall with a grain orientation extending in said end wall substantially perpendicular to the axis of said tubular body and continuing in the tubular wall of said tubular body substantially parallel to said axis thereof.

References Cited in the file of this patent
UNITED STATES PATENTS

| | | |
|---|---|---|
| 822,285 | Lee | June 5, 1906 |
| 1,211,193 | Long | Jan. 2, 1917 |
| 1,286,726 | Nobel | Dec. 3, 1918 |
| 1,581,512 | Coates | Apr. 20, 1926 |
| 2,260,914 | McGar | Oct. 28, 1941 |
| 2,349,970 | Lambeek | May 30, 1944 |
| 2,360,354 | Lyon | Oct. 17, 1944 |
| 2,371,716 | Snell | Mar. 20, 1945 |
| 2,532,804 | Friden | Dec. 5, 1950 |

OTHER REFERENCES

"The Extrusion of Metals," by Claude E. Pearson, John Wiley and Sons, Inc., 440 Fourth Avenue, New York, © 1953, pages 119–120.